Aug. 3, 1943.        R. H. BISHOP, JR        2,325,734
LYCOPODIUM HARVESTER OR CLIPPER
Filed Nov. 19, 1942        2 Sheets-Sheet 1
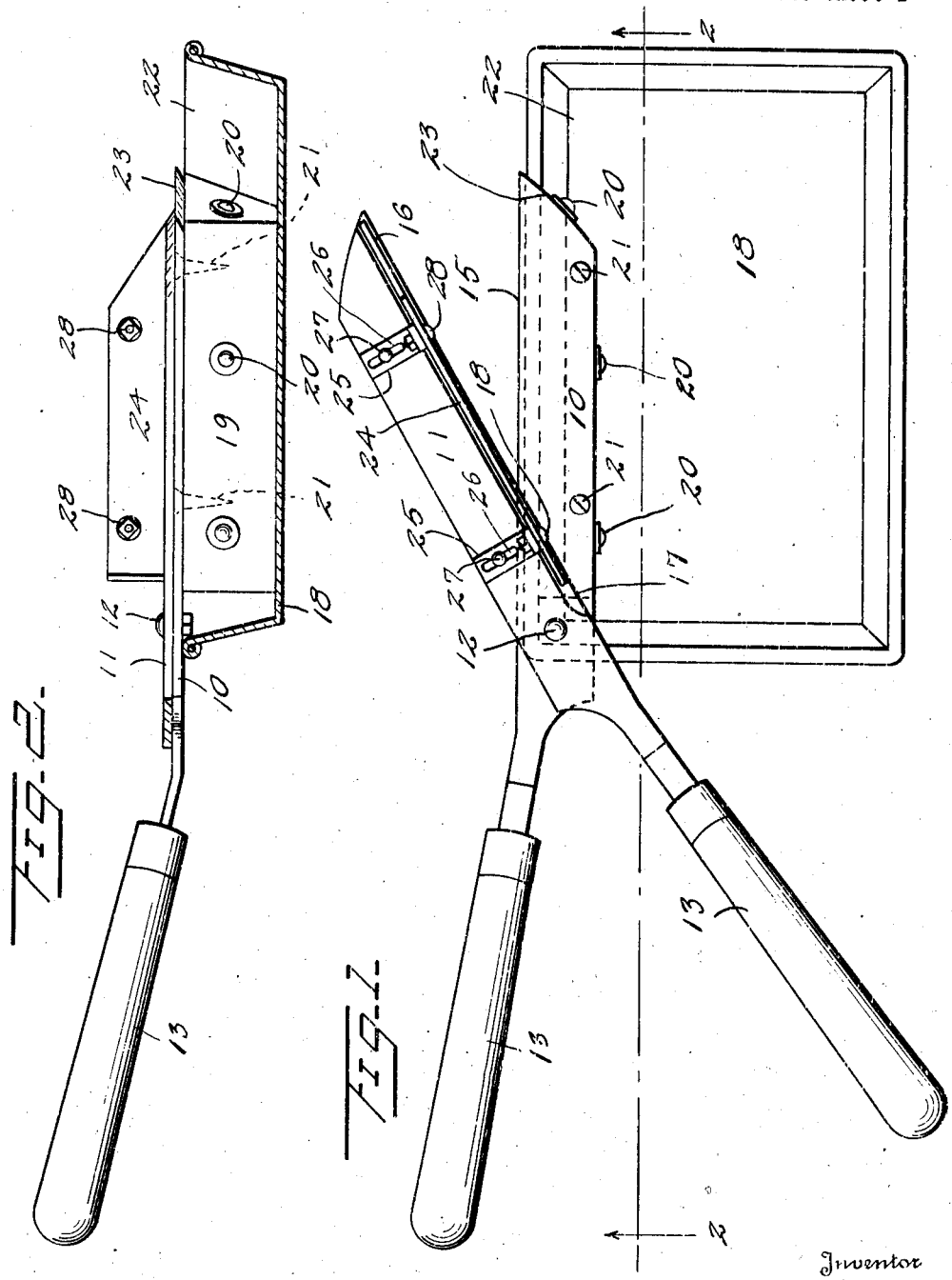
Inventor
R. H. Bishop, Jr.
By L. F. Rawnsley
Attorney Aug. 3, 1943.  R. H. BISHOP, JR  2,325,734
LYCOPODIUM HARVESTER OR CLIPPER
Filed Nov. 19, 1942    2 Sheets-Sheet 2
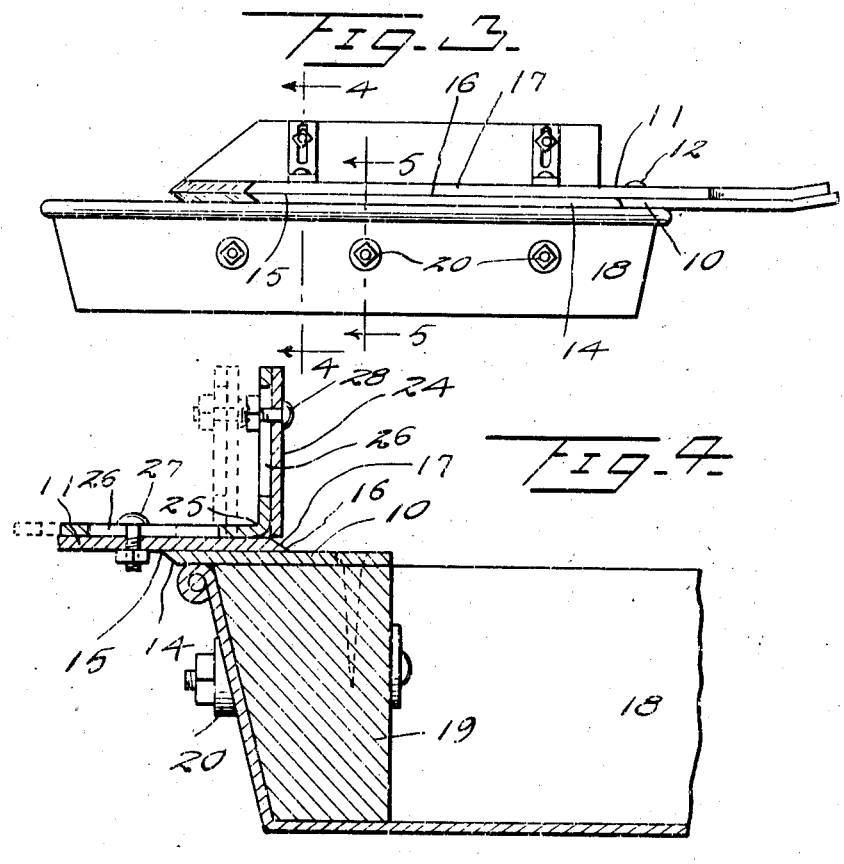
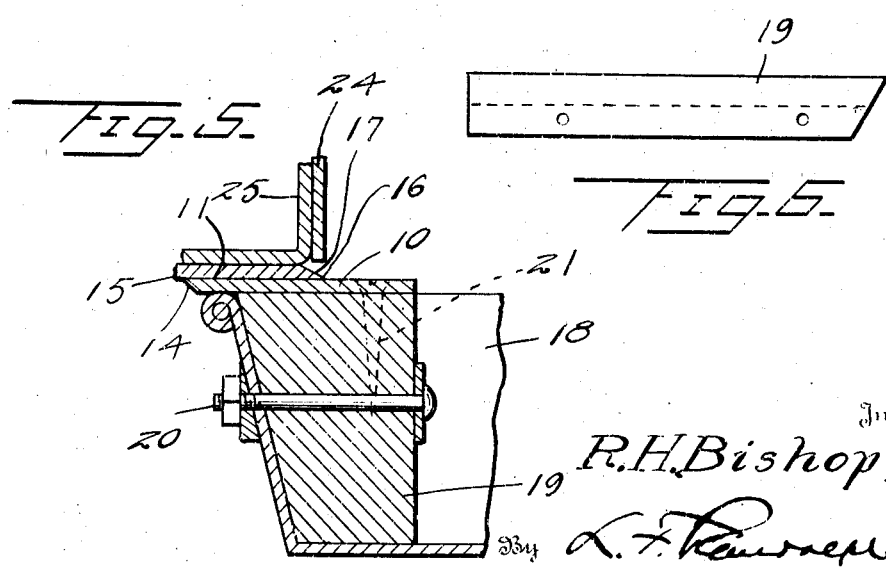

Patented Aug. 3, 1943

2,325,734

UNITED STATES PATENT OFFICE 2,325,734

LYCOPODIUM HARVESTER OR CLIPPER

Robert H. Bishop, Jr., Readfield, Maine

Application November 19, 1942, Serial No. 466,233

3 Claims. (Cl. 30—131)

This invention relates to apparatus for harvesting the spikes of *Lycopodium clavatum* and related plants or any equivalent, specifically to gather the spikes so that they may be subsequently dried and the powder thereof sifted therefrom.

It is particularly aimed to provide a structure having a shears, to one blade of which a receptacle is attached and the free end of which blade is spaced from or terminates short of an end wall of the receptacle.

It also is aimed to provide a means on the upper blade, preferably adjustable relatively thereto, to dislodge cut spikes and move them over the other blade and into the receptacle.

The more specific objects and advantages will in part be pointed out hereinafter and otherwise become apparent from a consideration of the description following taken in connection with accompanying drawings illustrating an operative embodiment.

In said drawings:

Figure 1 is a plan view of the device, with the blades in position to receive spikes or cuttings;

Figure 2 is a vertical sectional view taken on the plane of line 2—2 of Figure 1.

Figure 3 is a side elevation of the device, the handles being broken away;

Figure 4 is a vertical sectional detail on an enlarged scale taken on the plane of line 4—4 of Figure 3;

Figure 5 is an enlarged vertical sectional detail taken on the plane of line 5—5 of Figure 3 and Figure 6 is a plan view of the block or filler used to join the receptacle and a blade of the shears.

Referring specifically to the drawings, a pair of coacting shearing blades are provided at 10 and 11, bolted or otherwise pivotally connected together as at 12 and each provided with a manipulating handle 13, arranged at a convenient upward inclination if desired and as shown. Blade 10 is lowermost and at the outer longitudinal edge is upwardly beveled at 14 to provide a cutting or shearing edge 15 with which coacts the cutting or shearing edge 16, provided by beveling at 17 from above, the inner longitudinal edge of the blade 11.

Any suitably shaped metallic or other pan or receptacle such as 18 is carried by the lower blade 10. To this end, a filler or block 19 of wood or any other material is secured along one side of the receptacle in contact with the bottom and inner surface of such side, bolts 20, for instance being used as the fastening means and passing detachably through openings in both a block or filler and said side wall of the receptacle. Blade 10, is secured to the block or filler 19 as by means of screws 21 passing through openings therein and screw-threaded into the block.

It will be noted the cutting edge 15 is preferably arranged slightly beyond the receptacle and that blade 10 terminates a distance from one end of the receptacle provide a gap at 22 which will facilitate the fall of the spike into the receptacle and coacting toward this end, the free end of blade 10 as at 23 is curved or inclined from said cutting edge inwardly and away from said end of the receptacle and in addition is preferably beveled upwardly as shown in Figure 2 so as to be sharp at said end or edge 23. The filler 19 terminates short of the cutting edge 23 and also short of the remote end of the receptacle 18, to better accommodate the bolt 12 therein.

In order to remove or dislodge the spikes so that they will fall into the receptacle 18 and be moved off of the blade 10, a vertical deflector blade 24 is provided on the blade 11 preferably slightly inset from its shearing or cutting edge 16. Such deflector or plate 24 may be integral or rigid with the blade 11 if desired and may be either parallel or at an angle to the cutting edge 16, as preferred. Preferably the deflector 24 is detachable and adjustable being mounted by angular brackets 25, each arm of which is provided with elongated slots 26 enabling bolts 27 to be detachably passed through certain of them and through openings in the blade 11, and bolts 28 to be passed through the remainder and through openings in the deflector or plate 24.

In using the device, generally in the manner of shears, with the receptacle 18 lowermost, the spikes of the lycopodium or other plants or materials to be cut or harvested are engaged by reception between the cutting or shearing edges 15 and 16 when the blades are in the position shown in Figure 1. It will be clear that the device is manually held with both hands at the handles 13. The handles, after the spikes are received between the cutting edges, are moved toward each other to sever or cut or shear the spikes and the latter will fall into the receptacle 18, aided by the deflector 24 and cutting edge 23 and the gap 22.

Various changes may be resorted to provided they fall within the spirit and scope of the invention.

I claim as my invention:

1. Apparatus of the class described having a receptacle provided with an open top, a shearing blade rigid on said receptacle disposed in the plane of and across said top with its cutting edge outwardly of the receptacle and its opposite edge inwardly of the margin of the receptacle, a shearing blade pivoted to and movable across the first-mentioned shearing blade, and deflector means carried by the second-mentioned blade operative to dislodge cut material from the first-mentioned blade and discharge it over said opposite edge into the receptacle, the free end of the first-mentioned blade being spaced from a wall of the receptacle and extending inwardly away from the shearing edge and away from said wall.

2. Apparatus of the class described having a receptacle provided with an open top, a shearing blade rigid on said receptacle disposed in the plane of and across said top with its cutting edge outwardly of the receptacle and its opposite edge inwardly of the margin of the receptacle, a shearing blade pivoted to and movable across the first-mentioned shearing blade, and deflector means carried by the second-mentioned blade operative to dislodge cut material from the first-mentioned blade and discharge it over said opposite edge into the receptacle, said deflector extending upwardly at an angle from the blade, angle brackets having elongated slots in the legs thereof, and fastenings passing through said slots and the deflector and the companion blade.

3. Apparatus of the class described having a receptacle provided with an open top, a shearing blade rigid on said receptacle disposed in the plane of and across said top with its cutting edge outwardly of the receptacle and its opposite edge inwardly of the margin of the receptacle, a shearing blade pivoted to and movable across the first-mentioned shearing blade, and deflector means carried by the second-mentioned blade operative to dislodge cut material from the first-mentioned blade and discharge it over said opposite edge into the receptacle, angular brackets having elongated slots in the angles thereof, fastenings passing through said slots and the deflector and the companion blade, the connection between the receptacle and adjacent blade comprising a block, means fastening the block interiorly of the receptacle, and means securing the adjacent blade to the block.

ROBERT H. BISHOP, Jr.